April 6, 1965  S. W. HOLMES  3,176,705
GLOBE VALVE ADAPTER
Filed Feb. 4, 1959
Fig. 1
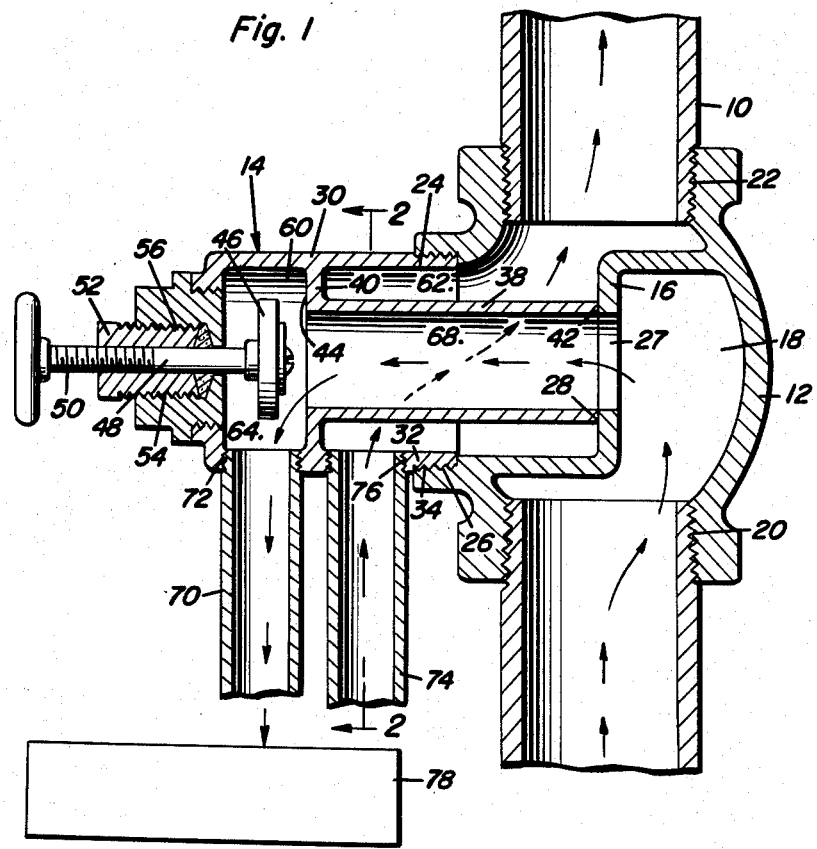
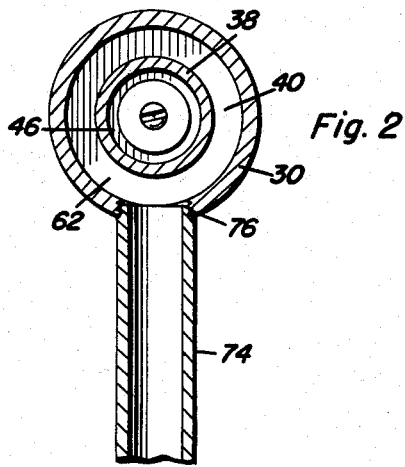
Fig. 2
Sterling W. Holmes
INVENTOR.

United States Patent Office 3,176,705
Patented Apr. 6, 1965

3,176,705
GLOBE VALVE ADAPTER
Sterling W. Holmes, 510 Norwood St., Brainerd, Minn.
Filed Feb. 4, 1959, Ser. No. 791,133
4 Claims. (Cl. 137—269)

This invention relates to valves and more particularly to an adapter for a valve to convert the valve from an ordinary, conventional valve, for example a globe valve, to a fluid transfer valve.

An object of the invention is to provide a mechanically simple, easily installed adapter to convert an ordinary valve into a fluid transfer valve. The invention has special application in those instances where a conventional valve is installed in a wall or other place making it difficult to reach, so that the fluid controlled by the valve in the usually concealed pipe line may be diverted from the original line, mixed or otherwise treated and then returned to the original line, without disturbing the original line or the location of the original valve.

Another object of the invention is to provide an adapter capable of converting a conventional valve into a valve which serves a somewhat different function from that of the original valve.

Another object of the invention is to provide a valve adapter which is capable of being installed without in any way disturbing the original position of the valve. All that is required is the removal of the original valve core assembly and the application of the adapter in the opening formerly occupied by the valve core assembly. In fact, even the threads by which the valve core assembly is held in place may be used as means for fastening the adapter to the original valve body.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a sectional view of a valve fitted with an adapter in accordance with the invention and diagrammatically showing a treatment station at which the diverted fluid from the line may be treated and then returned to the original line controlled by the modified valve.

FIGURE 2 is a sectional view taken on the line 2—2 of FIGURE 1.

In the accompanying drawings there is shown a conventional pipe line 10 within which a conventional valve body 12 is installed. Although the principles of the invention are useful in connection with various types of conventional valves, the valve body 12 is that of a globe valve. It is emphasized that adapter 14 may be used with many different makes of globe valves and other types of valves with equal success. Valve body 12 has a partition 16 which sub-divides the cavity 18 of the valve body into an inlet side having a fluid inlet 20 and an outlet side having a fluid outlet 22 to which parts of pipe line 10 are attached in the usual way. Threads 24 are in or adjacent to an opening 26 which ordinarily accommodates a valve core assembly, the valve of which cooperates with valve seat 28 in partition 16 to control the flow of fluid through the cavity 18 of the valve body.

Adapter 14 is composed of a hollow adapter housing 30 having a tubular section 32 with threads 34 that engage threads 24 and constitute means for securing the adapter body 30 to the valve body 12. Accordingly, adapter housing 30 is substituted for the valve core assembly of the original valve. A tube 38 or some other type of hollow conductor of fluid is attached to a transverse partition wall 40 extending across and connected to the adapter body 30. Tube 38 has an open end 42 which is disposed on valve seat 28, and an opposite end which is also open and which constitutes valve seat 44 for the valve element 46. Valve element 46 is a part of a core assembly 48 carried by adapter body 30 and adjustable to the seated and unseated position with reference to valve seat 44. The core assembly is, of itself, conventional, consisting of a valve stem 50 carried in plug 52, the latter being threaded in an opening 54 in the end of adapter body 30 and pressed against a packing gland 56 for the valve stem 50.

Partition wall 40 divides the cavity 60 of the adapter body 30 into a first chamber 62 and a second chamber 64. The first chamber is in registry with the outlet 22 side of chamber 18, and the second chamber 64 is in registry with the inlet 20 side of chamber 18 of the original valve body 12. Chamber 64 includes the passageway 68 and tube 38 as well as the portion of the cavity 60 on one side of partition wall 40.

Conductor 70, for instance, a pipe, tube or the like, is threaded into fluid outlet 72, the latter being in registry with the second chamber 64. A fluid conductor 74 is connected with inlet port 76 which is in registry with the first chamber 62. The conductors 70 and 74 may be directly connected to equipment in liquid treatment station 78 or may be a part of piping which indirectly connects to equipment, materials or other substances in treatment station 78. The purpose of the treatment station is to add substances to the liquid, filter the liquid, test the liquid or in any other way treat the liquid or gas or any other fluid or fluent substance passing through pipe line 10.

In operation the flow path is as shown by the arrows in FIGURE 1. Fluid which would ordinarily flow through pipe line 10 is diverted by passing through the port 27 in partition wall 16 and entering tube 38. If the valve 46 is unseated, the fluid continues through the remainder of chamber 64 and is discharged through outlet or port 72. The fluid then passes through conductor 70, enters the treatment station 78 and is returned to the adapter body by way of conductor 74, port 76 and chamber 62. Upon entering chamber 62 the only way that the fluid is capable of flowing is toward and through the original valve body outlet 22 whence it is returned to pipe line 10.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. The combination of a valve body provided with a partition separating the interior thereof into an inlet chamber and an outlet chamber and also provided in said partition with an opening extending therethrough, an adapter carried by said valve body and including a casing in communictiaon with said outlet chamber and a tubular member having one end thereof in abutment with said partition and in register with said opening whereby to communicate with said inlet chamber in exclusion of the outlet chamber, means for delivering fluid from the other end of said tubular member to the interior of said casing whereby fluid entering said inlet chamber may be passed through said fluid delivering means to the outlet chamber, said fluid delivery means including a by-pass passage external of said adapter casing and valve body adapted to be connected in series with a fluid treatment station, one end of said by-pass passage connected to said tubular member, another end of said by-pass passage connected to said outlet chamber through said adapter casing, valve means in said adapter for controlling the flow of fluid through the fluid delivering means, said other end of said tubular member constituting a valve seat, and said valve means including a valve member provided in said adapter and cooperating with said valve seat.

2. The combination of a valve body provided with a partition separating the interior thereof into an outlet chamber and an inlet chamber and also provided in said partition with an opening, an adapter carried by said valve body and including a casing provided with a partition wall separating the same into an outer flow chamber and an inner flow chamber, said partition wall being provided with an opening therethrough surrounded by a valve seat, a tubular member secured at one end thereof to said partition wall in register with said valve seat and extending axially in said outer flow chamber into said valve body, the other end of said tubular member abutting said partition in said valve body and communicating with the opening therein whereby fluid entering said inlet chamber may pass through said tubular member into said inner flow chamber, said outer flow chamber surrounding said tubular member and communicating with said outlet chamber whereby fluid entering said outer flow chamber may pass into the outlet chamber, a valve member provided in said inner flow chamber and cooperating with said valve seat for controlling the flow of fluid from said tubular member into the inner flow chamber, and passage means exterior of said adapter and valve body for delivering fluid from said inner flow chamber to said outer flow chamber.

3. The combination of a valve body provided with a partition separating the interior thereof into an outlet chamber and an inlet chamber and also provided in said partition with an opening, an adapter carried by said valve body and including a casing provided with a partition wall separating the same into an outer flow chamber and an inner flow chamber, said partition wall being provided with an opening therethrough surrounded by a valve seat, a tubular member secured at one end thereof to said partition wall in register with said valve seat and extending axially in said outer flow chamber into said valve body, the other end of said tubular member abutting said partition in said valve body and communicating with the opening therein whereby fluid entering said inlet chamber may pass through said tubular member into said inner flow chamber, said outer flow chamber surrounding said tubular member and communicating with said outlet chamber whereby fluid entering said outer flow chamber may pass into the outlet chamber, a valve member provided in said inner flow chamber and cooperating with said valve seat for controlling the flow of fluid from said tubular member into the inner flow chamber, and means for delivering fluid from said inner flow chamber to said outer flow chamber, a fluid treating station disposed exteriorly of said adapter, said fluid delivering means being connected at one end thereof to said inner flow chamber and at its other end to said outer flow chamber in series with said fluid treating station.

4. The combination of a valve body providing a partition separating the interior thereof into an outlet chamber and an inlet chamber and also provided in said partition with an opening, an adapter carrier by said valve body and including a casing provided with a partition wall separating the same into an outer flow chamber and an inner flow chamber, said partition wall being provided with an opening therethrough surrounded by a valve seat, a tubular member secured at one end thereof to said partition wall in register with said valve seat and extending axially in said outer flow chamber into said valve body, the other end of said tubular member abutting said partition in said valve body and communicating with the opening therein whereby fluid entering said inlet chamber may pass through said tubular member into said inner flow chamber, said outer flow chamber surrounding said tubular member and communicating with said outlet chamber whereby fluid entering said outer flow chamber may pass into the outlet chamber, a valve member provided in said inner flow chamber and cooperating with said valve seat for controlling the flow of fluid from said tubular member into the inner flow chamber, and means for delivering fluid from said inner flow chamber to said outer flow chamber, a fluid treating station disposed exteriorly of said adapter, said fluid delivering means comprising an inlet conduit extending from said inner flow chamber to said treating station and an outlet conduit extending from said station to said outer flow chamber, whereby fluid entering said inlet chamber may pass through said treating station before delivery through said outlet chamber.

References Cited by the Examiner
UNITED STATES PATENTS

| | | | |
|---|---|---|---|
| 796,576 | 8/05 | Graham | 137—614.19 X |
| 2,629,580 | 2/53 | Schultis | 137—454.6 |
| 2,658,715 | 11/53 | Kistner | 137—454.6 |
| 2,703,584 | 3/55 | Mix | 137—454.6 |

FOREIGN PATENTS 383,680  10/23  Germany.

ISADOR WEIL, *Primary Examiner.*

M. CARY NELSON, *Examiner.*